(12) United States Patent
Choi

(10) Patent No.: US 11,693,493 B2
(45) Date of Patent: Jul. 4, 2023

(54) DOT FILM, MULTI-LAYERS OPTIC SHEET AND SMART ELECTRIC BOARD

(71) Applicant: DIPSONE TECH INC., Yongin-si (KR)

(72) Inventor: Hae Rang Choi, Yongin-si (KR)

(73) Assignee: DIPSONE TECH INC., Yongin-si (KR)

( * ) Notice: Subject to any disclaimer, the term of this patent is extended or adjusted under 35 U.S.C. 154(b) by 155 days.

(21) Appl. No.: 17/295,757

(22) PCT Filed: Nov. 11, 2019

(86) PCT No.: PCT/KR2019/015247
§ 371 (c)(1),
(2) Date: May 20, 2021

(87) PCT Pub. No.: WO2020/122436
PCT Pub. Date: Jun. 18, 2020

(65) Prior Publication Data
US 2022/0011886 A1    Jan. 13, 2022

(30) Foreign Application Priority Data
Dec. 10, 2018  (KR) ........................ 10-2018-0158643

(51) Int. Cl.
*G06K 19/06*    (2006.01)
*G06F 3/0354*   (2013.01)
(Continued)

(52) U.S. Cl.
CPC ........ *G06F 3/03545* (2013.01); *G06F 3/0383* (2013.01); *G06F 3/041* (2013.01); *B32B 2307/75* (2013.01)

(58) Field of Classification Search
None
See application file for complete search history.

(56) References Cited

U.S. PATENT DOCUMENTS

2009/0057419 A1* 3/2009 Bartolome ....... G06K 19/06037
235/494

FOREIGN PATENT DOCUMENTS

KR    10-1362463 B1    2/2014
KR    10-1568007 B1    11/2015
(Continued)

*Primary Examiner* — Carl Adams
(74) *Attorney, Agent, or Firm* — NKL Law; Jae Youn Kim

(57) ABSTRACT

The present invention provides a dot film, a multi-layers optic sheet comprising the dot film, and a smart electric board having the multi-layers optic sheet attached thereto, the dot film comprising: a base layer made of a synthetic resin; a resin layer coated with a resin mixture on the rear surface of the base layer; and a dot layer on which fine dots are formed by printing such that a printing material permeates the resin layer, wherein the dot layer has a plurality of dots formed therewith which are spaced apart from each other at crossing points of virtual grid lines, and has location information encrypted therein so as to determine location information of an electronic pen when writing with the electronic pen. According to the present invention, the optic sheet has a thinned thickness, a minimized possibility of an inflow of particles between layers in the production process, and a low reflectance and scattering rate, and thus has an excellent reactivity and recognition rate for the electronic pen, and UV printing is possible as well as the printing of inkjet and laser printers etc., the production cost thereof is low, and there is an effect of easily permeating and printing printed material.

5 Claims, 17 Drawing Sheets

(51) Int. Cl.
*G06F 3/038* (2013.01)
*G06F 3/041* (2006.01)

(56) References Cited

FOREIGN PATENT DOCUMENTS

| | | |
|---|---|---|
| KR | 10-1766447 B1 | 8/2017 |
| KR | 10-1784088 B1 | 10/2017 |
| KR | 10-1886779 B1 | 8/2018 |
| KR | 10-1973155 B1 | 4/2019 |
| WO | 01-026032 A1 | 4/2001 |

* cited by examiner

DOT FILM, MULTI-LAYERS OPTIC SHEET AND SMART ELECTRIC BOARD

TECHNICAL FIELD

The present invention relates to a dot film, a multi-layers optic sheet and a smart electric board, in particular, to a dot film for writing with an electronic pen, on which a dot pattern having location information is formed and which is capable of determining the location information of the electronic pen to be written thereon, and a multi-layers optic sheet comprising the dot film, and a smart electric board comprising the optic sheet.

BACKGROUND ART

In general, an electronic pen enables writing by recognizing its trajectory wherever a dot pattern is formed, and if is connected to devices such as electronic notebooks, notebooks, smartphones, smart TVs, and electronic blackboards, since the written content is transmitted in real time and displayed on the screen, it is possible to check immediately, and the created and edited content can be saved in the internal memory or shared with other users or devices through mail, SNS, cloud, etc. The method of recognizing an electronic pen is a touch screen method or a method using an external sensing sensor. In the case of these methods, as the size of the display screen increases, the manufacturing cost increases, the power consumption rapidly increases, and the recognition rate decreases. Accordingly, a technology for finely forming an encoding pattern including location information on a display screen or film and determining the relative or absolute position of an electronic pen written on the surface has been developed. As a related prior art, International Publication No. 2001 026032 (published on Apr. 12, 2001) discloses a paper with coding of patterns in which a large number of marks are formed, wherein an electronic pen is used on the encoded paper for optical reading that operates on the absolute position coding pattern, and each represents a nominal position and determines the position. However, in the above-described prior art, when using an electronic pen and when used on a glossy surface such as coated paper or whiteboard, or on a light emitting surface such as a liquid crystal screen, the recognition rate of the sensor is lowered or the pattern image is distorted due to light saturation, making it difficult to accurately identify the dot pattern, resulting in a problem in positioning and decoding. However, if the paper is manufactured opaque, there is a problem that the background or the display screen is not clearly visible. As another conventional technique, Korean Patent Publication No. 10-1766447 (published on Aug. 8, 2017) discloses a multi-layers optic sheet comprising a patterned film with a fine pattern consisting of dots that are formed at intervals between crossing points of virtual grid lines and have the encrypted location information so that the location information of the electronic pen can be judged when writing, a diffusion film formed in front of the patterned film, a protective film formed in front of the diffusion film and treated with anti-glare coating, a block film that is formed in the rear of the patterned film and blocks by reflecting some of the light emitted from the image device, and an adhesive layer formed on the rear of the block film and attached to the front surface of an image device or blackboard, and a smart electric board comprising the same. However, the above-described prior art includes a large number of film layers and thus increases the thickness of the optic sheet, decreases reactivity to the electronic pen, increases the possibility of introducing fine particles between layers in the manufacturing process, and is capable of only UV printing in order to form a dot pattern, so there is a problem that an expensive large-sized device is required.

DISCLOSURE

Technical Problem

It is an object of the present invention to provide a dot film which is capable of reducing the thickness of an optic sheet, minimizes the possibility of inflow of particles between layers during a manufacturing process, has excellent reactivity and recognition rate for an electronic pen due to the low reflectance and scattering rate, is capable of printing by printers such as inkjet and laser as well as UV printing, has low production cost, and facilitates penetration and printing of a printing material, and a multi-layers optic sheet and a smart electric board.

Technical Solution

The present invention provides a dot film capable of tracking a handwriting trajectory by an electronic pen so that the handwriting is recognized and displayed on a screen or a blackboard of an image device, which comprises a base layer made of a synthetic resin; a resin layer coated with a resin mixture on the rear surface of the base layer; and a dot layer on which fine dots are formed by printing such that a printing material permeates the resin layer, wherein the dot layer has a plurality of dots formed therewith which are at intervals from crossing points of virtual grid lines, and has location information encrypted therein so as to determine location information of an electronic pen when writing with the electronic pen.

In addition, the present invention provides a dot film that enables tracking of a writing trajectory with an electronic pen so that the writing is recognized and displayed on a screen or blackboard of an image device, wherein the dot film is formed by applying a resin mixture to the base layer of a synthetic resin, printing a printing material on the rear surface of the resin layer so as to impregnate it thereon and to form fine dots, and then separating and removing the base layer from the resin layer, and then attaching a protective film to the front surface of the separated resin layer, and wherein the dot layer has a plurality of dots formed therewith which are at intervals from crossing points of virtual grid lines, and has location information encrypted therein so as to determine location information of an electronic pen when writing with the electronic pen.

In addition, the present invention provides a multi-layers optic sheet comprising the dot film and a smart electric board comprising the multi-layers optic sheet.

Advantageous Effects

According to the present invention, the optic sheet has a thinned thickness, a minimized possibility of an inflow of particles between layers in the production process, and a low reflectance and scattering rate, and thus has an excellent reactivity and recognition rate for the electronic pen, and UV printing is possible as well as the printing of inkjet and laser printers etc., the production cost thereof is low, and there is an effect of easily permeating and printing a printing material.

In addition, it is attached to an image device and an electronic or green blackboard etc. using an electronic pen, thereby making it possible to judge the exact location information of the dot pattern by the electronic pen and to allow the position to be determined, and visibility and clarity of the display screen are increased, and if it is manufactured in a sheet type, it is possible to roll it, so it is effective that it is easy to store and move.

In addition, the optical sheet can be attached to the front surface, allowing the use of the electronic pen, and it is possible, by selectively implementing transparent and opaque displays, to convert the image device into a blackboard while executing it, and such conversion is quick and convenient and enables smooth progression of lectures without turning off pulses in the middle, and not only is it possible to write during video lectures or presentations, but also diffused reflections can be eliminated, and the visibility and clarity of the image projected on the writing surface are increased, and there is an effect of delivering the lecture contents intensively.

In addition, since the infrared-sensitive sensor or touch panel for detecting the writing mean applied to the existing electronic blackboard is unnecessary, it can be applied to a large image device or an electronic blackboard, and it has the effect of making video lessons possible by attaching it to a green blackboard and projecting a beam projector.

DESCRIPTION OF DRAWINGS

FIG. 5c is a cross-sectional view of the optic sheet of FIG. 5a.

BEST MODE

Hereinafter, the present invention will be described in detail with reference to embodiments with respect to specific details for implementing the dot film, multi-layers optic sheet, and smart electric board according to the present invention.

Figure 1A:
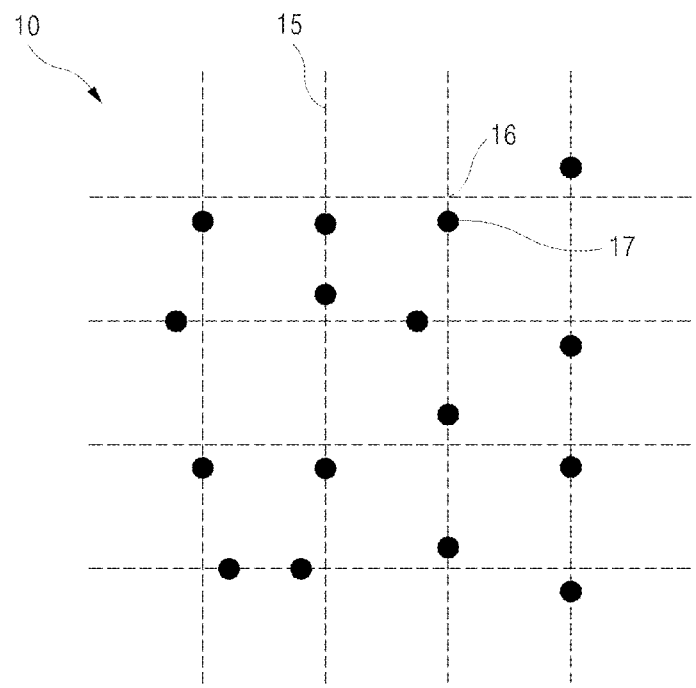
FIG. 1a and FIG. 1b are enlarged views showing virtual grid lines, crossing points, and dots of the patterned film of the present invention.
Figure 1B:
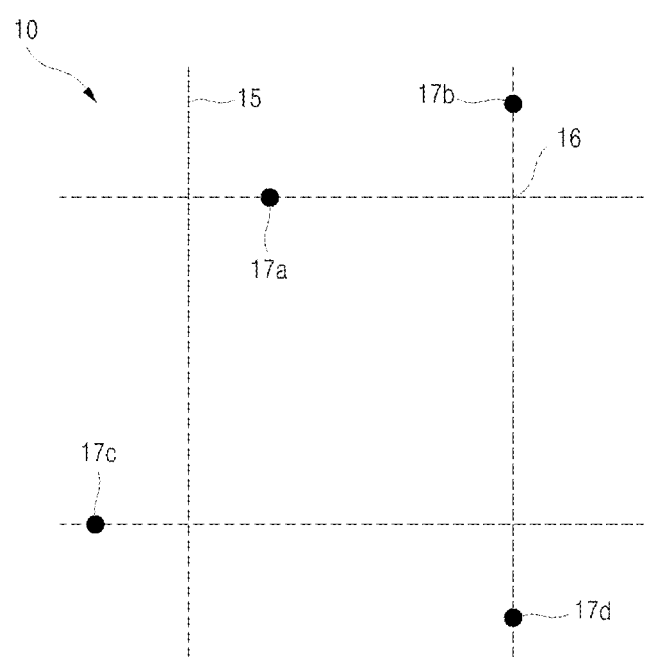

Referring to FIG. 1a, the dot film (10) according to the present invention enables tracking of the writing trajectory of the electronic pen so that writing is recognized and displayed on the screen or blackboard of the image device, the dots (17) are formed at predetermined intervals from the crossing points 16 where virtual grid lines (15) intersect, and have respective dot values, and these dot values may be configured by a combination of at least two or more different numbers and have fine pattern information in which location information is encrypted so that location information of the electronic pen (P) can be determined during writing. The dots (17) may be made of an infrared absorbing ink made of a phthalocyanine-based compound, a naphthalocyanine-based compound, an aluminum-based compound, etc., and each dot (17) may provide location information based on a coordinate value of a pattern determined according to a location formed around the crossing point (16) of the virtual grid line (15). For example, referring to FIG. 1b, the dot (17) can exist in 4 different positions according to the relationship with the crossing point (16) of the virtual grid line (15), and when the dot (17a) is present at the right position of the crossing point (16), the dot value is indicated as "1", when the dot (17b) is present at the right position of the crossing point (16), the dot value is indicated as "2", when the dot (17c) is present at the right position of the crossing point (16), the dot value is indicated as "3", and when the dot (17d) is present at the right position of the crossing point (16), the dot value is indicated as "4", thereby providing location information according to the location of the dot (17) centered on the crossing point (16) of the virtual grid line (15). In addition, the dot (17) may be formed in a diagonal direction rather than on the virtual grid line (15), and a plurality of dots (17) may be formed at the crossing points (16) of one virtual grid line (15) to provide location information. In this case, each dot value can be expressed by arbitrary coordinates in a manner that is divided into x-coordinate and y-coordinate, and the location information can be provided from these coordinate values. The virtual grid lines (15) can be formed horizontally and vertically along a regular interval, the distance between the grid lines (15) can be formed in 250 to 300 μm, the dot (17) may be formed at a point at a distance of ⅛ to ¼ centered on the crossing point (16) of the virtual grid line (15), and the dot (17) may be formed in association with two or more dots centered on the crossing point (16) of the virtual grid line (15), and its diameter is in the range of 50 to 100 μm.

Figure 2A:
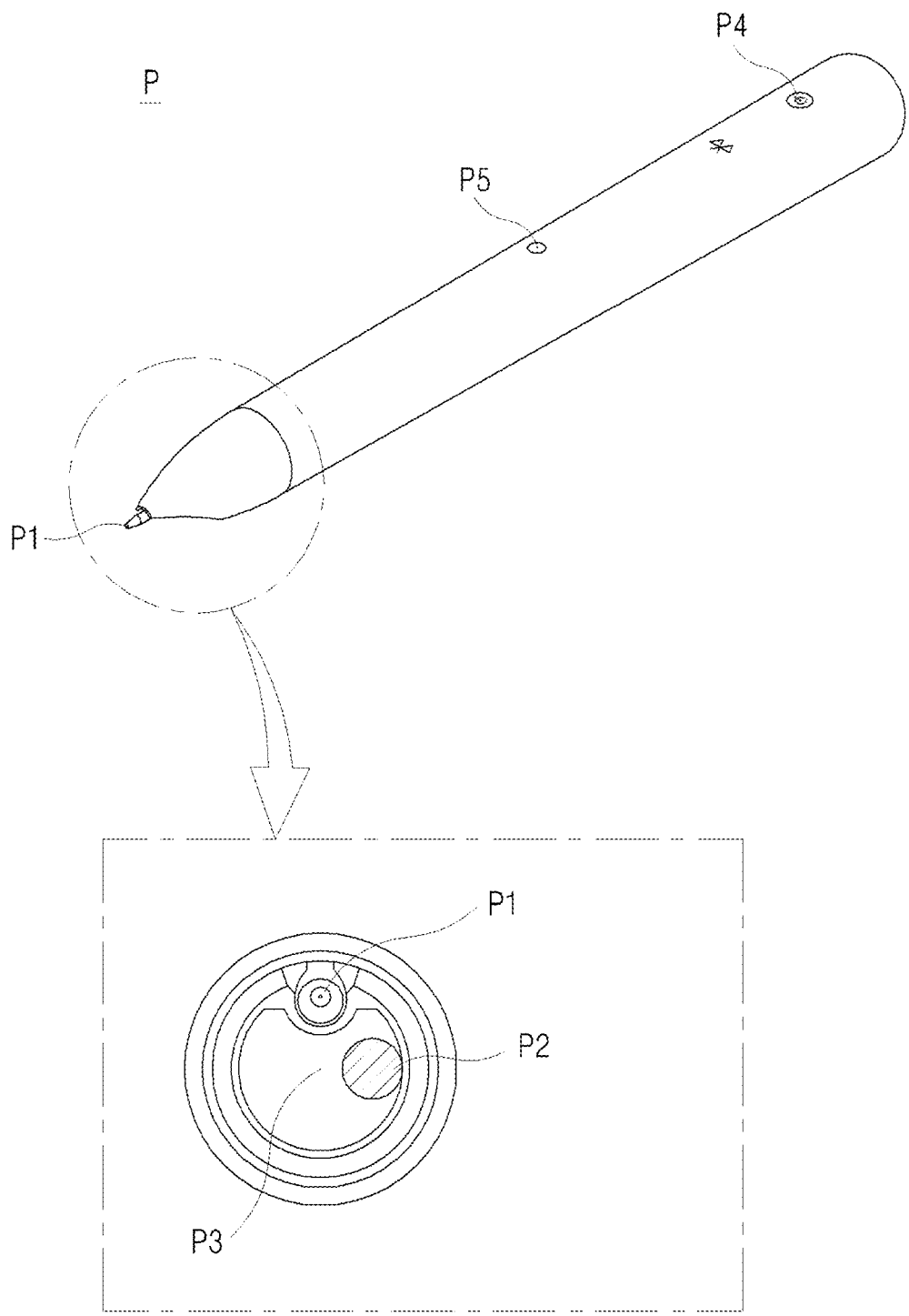
FIG. 2a is a perspective view showing an electronic pen used for writing on the optic sheet of the present invention.
Figure 2B:
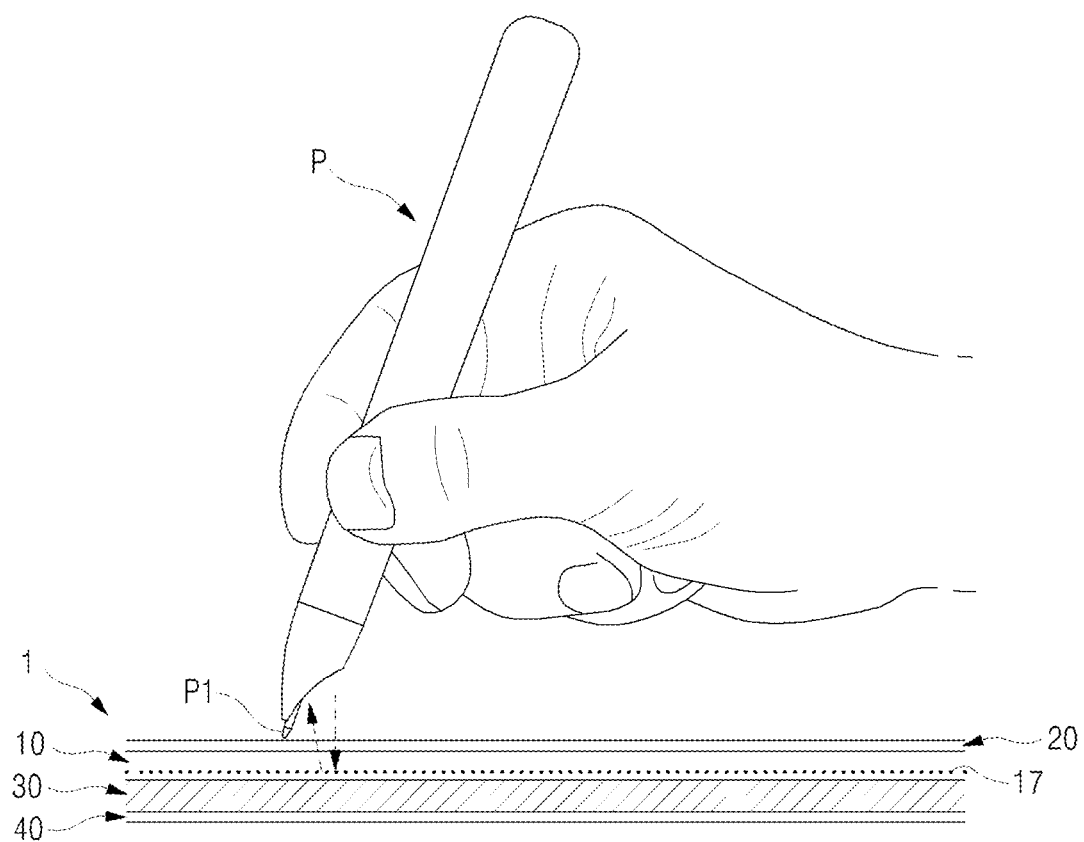
FIG. 2b is a drawing showing the state of use of the electronic pen, which shows the enlarged size of the optic sheet.

Referring to FIG. 2a, the electronic pen (P) is made in the form of a synthetic resin or silicone nib at one end, and has a pen tip (P1) that protrudes to the outside so that writing is made on the surface of the optic sheet (1), and the pen tip (P1) is detachably provided, and after separating the pen tip (P1), a ballpoint pen having ink stored therein may be mounted to allow writing on paper or the like. Referring to FIG. 2b, the electronic pen (P) has a light source (P2) and a sensor (P3) therein. The light source (P2) transmits and emits infrared rays to the outside, and the sensor (P3) is an infrared sensor, which detects infrared rays scattered from a portion of the dot film (10), in which the dot (17) is not formed, and which may calculate position information by continuously sensing pattern information of the dots (17) formed on the dot film (10) to calculate the absolute coordinate value. For example, when 36 dots (17) are recognized on the 6×6 virtual grid lines (15) of 6 horizontal and vertical lines, the position information according to each dot value is calculated, and the absolute coordinate value on the optic sheet (1) can be determined using this. In addition, a power supply switch (P4) and a charging terminal (not shown) are formed at the other end of the electronic pen (P). A wireless communication module (not shown) capable of performing short-range wireless communication such as WiFi and Bluetooth and a rechargeable battery (not shown) are built into the electronic pen (P), and a condition sign lamp (P5) is formed in the middle of the electronic pen (P). Accordingly, the coordinate values sensed and calculated by the sensor (P3) are analyzed by the control unit provided in the electronic pen (P) itself, and then are transmitted to an external device through the wireless communication module and displayed on the display screen, or are transmitted to external devices such as computers, notebook computers, liquid crystal TVs, and smartphones by the wireless communication module and analyzed by the processor of the external device, and then the actual coordinate values where the electronic pen (P) is located are calculated and displayed on the display screen.

Figure 3A:
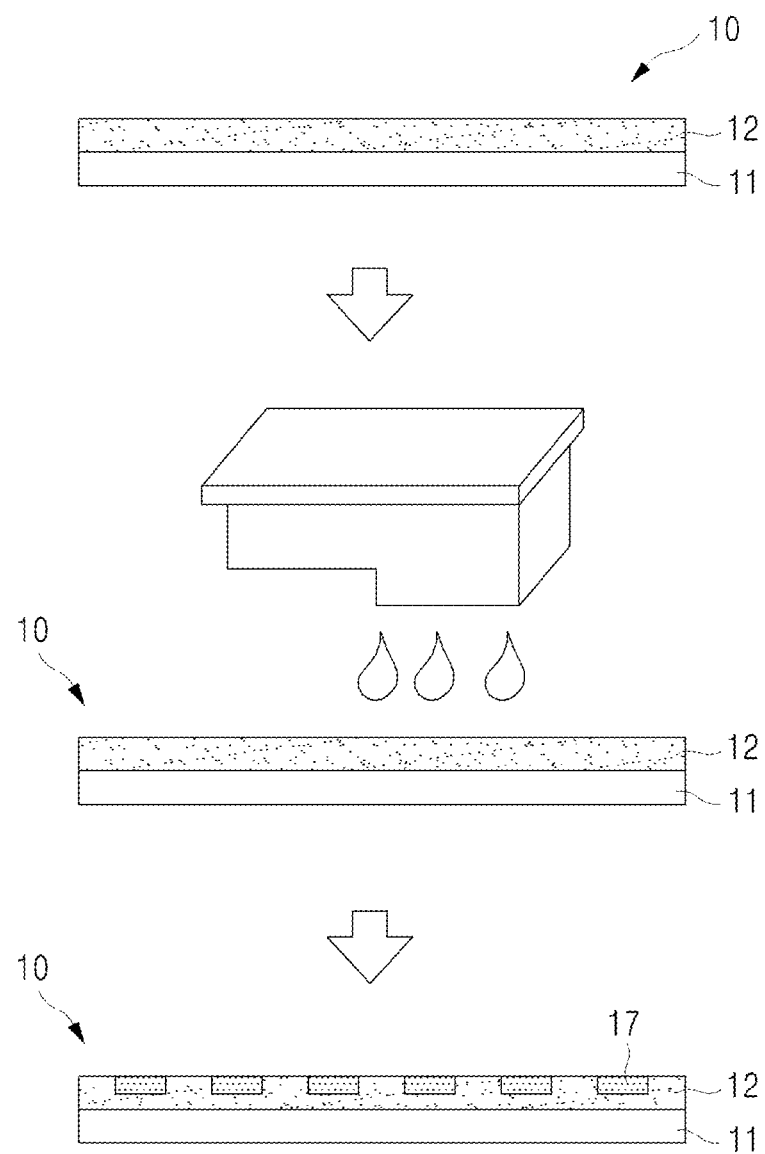
FIG. 3a and FIG. 3b are drawings showing the dot film of the present invention and a method of manufacturing the same.

In the first embodiment, referring to FIG. 3a, the dot film (10) includes a base layer made of a synthetic resin (11), and the synthetic resin may be consisted of PET, polycarbonate, polyester, and the like. There are problems that since the base layer (11) has a smooth surface, static electricity may occur, the printed image is unclear when directly printing by a printer such as inkjet, laser, etc. and it is difficult to perform continuous printing, and the base layer (11) may be detached and lifted up or distorted due to thermal instability, and since it has poor adhesion or adhesion to printing materials such as ink or toner and thus the printing can be dropped or disappeared therefrom, it is only possible to do UV printing, so it requires a large expensive device, and it has poor reactivity on the electronic pen due to the reflection and scattering of light by the printing material. Accordingly, by forming a resin layer (12) formed by coating a resin mixture on the rear surface of the base layer (11), and printing a printing material on the resin layer (12) so that the printing material permeates into the resin layer (12) to form a dot layer having a fine dot pattern, it is possible to reduce the thickness by reducing the number of layers of the conventional optic sheets, to increase adhesive force and stickiness of the printing material and to obtain a clearer dot pattern image, and it is possible to secure excellent reactivity and recognition rate for the electronic pen due to the low reflectance and scattering rate.

Figure 3B:
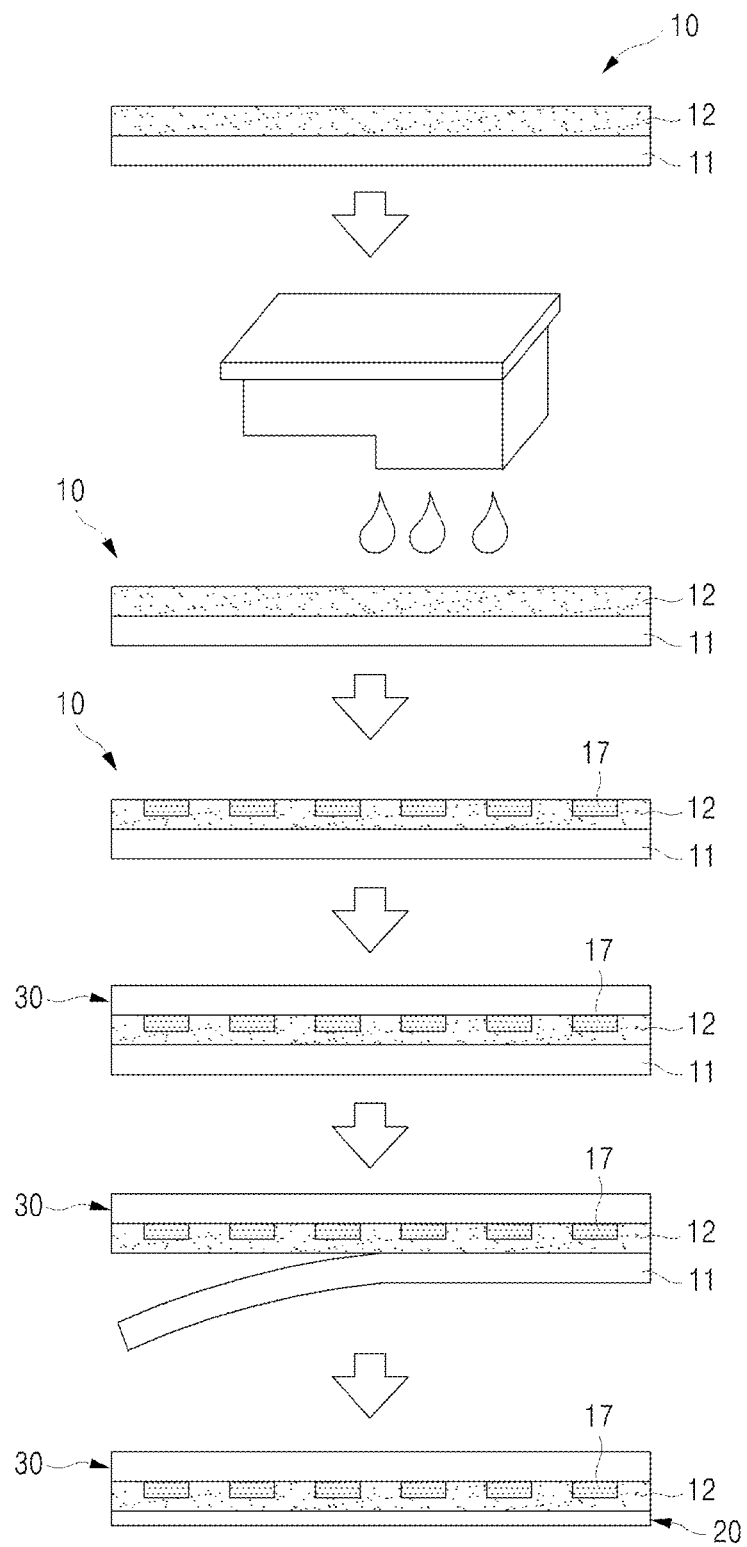

In the first embodiment, referring to FIG. 3b, the dot film (10) is formed by applying a resin mixture to the base layer (11) of synthetic resin to form a resin layer (12) and printing a printing material so that it penetrates the rear surface of the resin layer to form a dot layer having a fine dot pattern. After attaching the resin layer (12) of the dot film consisting of the base layer (11), the resin layer (12) and the dot layer to the block film (30), the base layer (11) attached to the resin layer is separated. Next, if the protective film (20) is attached to the front surface of the resin layer (12) from which the base layer (11) is separated, it is possible to manufacture a thinner thin film than in the first embodiment described above, as well as the reaction rate and the recognition rate will be more excellent.

The resin mixture may contain 30 to 50% by weight of a polyolefin-based resin, 15 to 25% by weight of a silicone resin, 15 to 25% by weight of an urethane methacrylate oligomer, 5 to 10% by weight of methylene diphenyl diisocyanate, 1 to 5% by weight of tetrahydrofurfuryl methacrylate, 1 to 5% by weight of polyvinylpyrrolidone, 1 to 3% by weight of 2-phenoxyethyl methacrylate, 1 to 3% by weight of polymethacrylate, 0.5 to 2% by weight of 1,4-phenylenebisoxazoline, 0.5 to 1.5% by weight of 1,4-butanediol diacrylate, 0.5 to 1.5% by weight of tetraethylene glycol dimethacrylate, 0.5 to 1.5% by weight of bis(3-ethyl-5-methyl-4-maleimidophenyl)methane, 0.5 to 1.5% by weight of N-[4-(2-benzimidazolyl)phenyl]maleimide, 0.5 to 1.5% by weight of stannous oleate, 0.5 to 1.5% by weight of dibutyltin diacetate, 0.5 to 1.5% by weight of N,N'-bis(2-methyl-1-imidazolyl ethyl) urea, 0.1 to 1.0% by weight of p-toluenesulfonyl hydrazide, 0.1 to 1.0% by weight of epichlorohydrin, and 0.5 to 1.0% by weight of an antistatic agent.

The polyolefin-based resin can give elasticity, improve stiffness and heat resistance, exhibit thermal stability even when the temperature rises due to heating or compression of the printer during printing, and has improved flowability due to its low viscosity when mixed with the silicone resin. As such a polyolefin-based resin, isotactic polypropylene can be used. The polyolefin-based resin is preferably contained in an amount of 30 to 50% by weight. If the polyolefin-based resin is less than 30% by weight, the flowability and heat resistance may decrease. If the polyolefin-based resin exceeds 50% by weight, the strength may decrease. The silicone resin has elasticity, shows resilience and flexibility, has excellent moisture resistance, and thus can be used under high temperature and high humidity conditions and improve the preservability of the printing material printed on the resin layer (12). For these purposes, the silicone resin is preferably contained in an amount of 15 to 25% by weight. If the silicone resin is less than 15% by weight, the resilience and flexibility may be reduced, resulting in cracks. If the silicone resin exceeds 25% by weight, the heat resistance and flowability may be decreased, making it difficult to use. The urethane methacrylate oligomer is obtained by reacting polyol and polyisocyanate compounds, and has excellent stickiness, and thus increases the stickiness of the printing material printed on the resin layer (12) to prevent its peeling, and has excellent flexibility, hardness, and light resistance. The urethane methacrylate oligomer is preferably contained in an amount of 15 to 25% by weight. If the urethane methacrylate oligomer exceeds 25% by weight, the dispersibility and flowability may be decreased. Methylene diphenyl diisocyanate is a chemical substance of aromatic diisocyanate, has excellent heat resistance and resists the temperature rise of the roller during printing, thereby increasing printability and quality and improving durability. If methylene diphenyl diisocyanate is preferably contained in an amount of 5 to 10% by weight, and if methylene diphenyl diisocyanate exceeds 10% by weight, flowability may be lowered. Tetrahydrofurfuryl methacrylate is added in an amount of 1 to 5% by weight, and functions as a diluent and improves adhesion. Polyvinylpyrrolidone is a polymer of N-vinyl-2-pyrrolidone, and has hygroscopicity, and thus accepts and absorbs printing materials. Polyvinylpyrrolidone is preferably contained in an amount of 1 to 5% by weight. If polyvinylpyrrolidone exceeds 5% by weight, dispersibility and flowability may be deteriorated. 2-phenoxyethyl methacrylate is an aromatic methacrylate, which lowers the coefficient of friction and has excellent scratch resistance. 2-phenoxyethyl methacrylate may be contained in an amount of 1 to 3% by weight, so that a clear dot pattern image can be obtained, and continuous printing can be facilitated. Polymetamethylacrylate has hygroscopicity, which accepts and absorbs the printing material and has excellent adhesion to the printing material, so it fixes the printing material and prevents the spread of the printing material. For these purposes, polymetamethylacrylate may be contained in an amount of 1 to 3% by weight. 1,4-Phenylenebisoxazoline is an amine-based additive, which is added to increase heat resistance and durability so as not to be damaged in a high temperature environment. It is preferable that 1,4-phenylenebisoxazoline is contained in an amount of 0.5 to 2% by weight. 1,4-Butanediol diacrylate and tetraethylene glycol dimethacrylate are crosslinking agents, which are contained together in an amount of 0.5 to 1.5% by weight, respectively. 1,4-Butanediol diacrylate and tetraethylene glycol dimethacrylate can interconnect molecular sieves to form polymers and increase the crosslinking density to enhance mechanical properties. Bis(3-ethyl-5-methyl-4-maleimidophenyl)methane and N-[4-(2-benzimidazolyl)phenyl]maleimide are compounds having a maleimide group, which function as crosslinking aids, are contained together in an amount of 0.5 to 1.5% by weight, respectively, and promote the reaction due to their high reactivity. Stannous oleate and dibutyltin diacetate are contained together in an amount of 0.5 to 1.5% by weight, respectively, which increase the chemical reaction rate and promote crosslinking to activate crosslinking. N,N'-bis(2-methyl-1-imidazolyl ethyl) urea is contained in an amount of 0.5 to 1.5% by weight, which stabilizes the resin layer and increases the curing rate. p-Toluenesulfonyl hydrazide is contained in an amount of 0.1 to 1.0% by weight, which functions as a blowing agent. Epichlorohydrin is contained in an amount of 0.1 to 1.0% by weight, which functions as a stabilizer to stabilize the compound. The antistatic agent may be a CYASTAT series from Cyanamid company and may be contained in an amount of 0.5 to 1.0% by weight, and it can suppress the generation of static electricity on the surface of the resin layer (12), and thus can remove static electricity generated by friction during the printing operation of the printer and prevent foreign substances from adhering.

Figure 4:
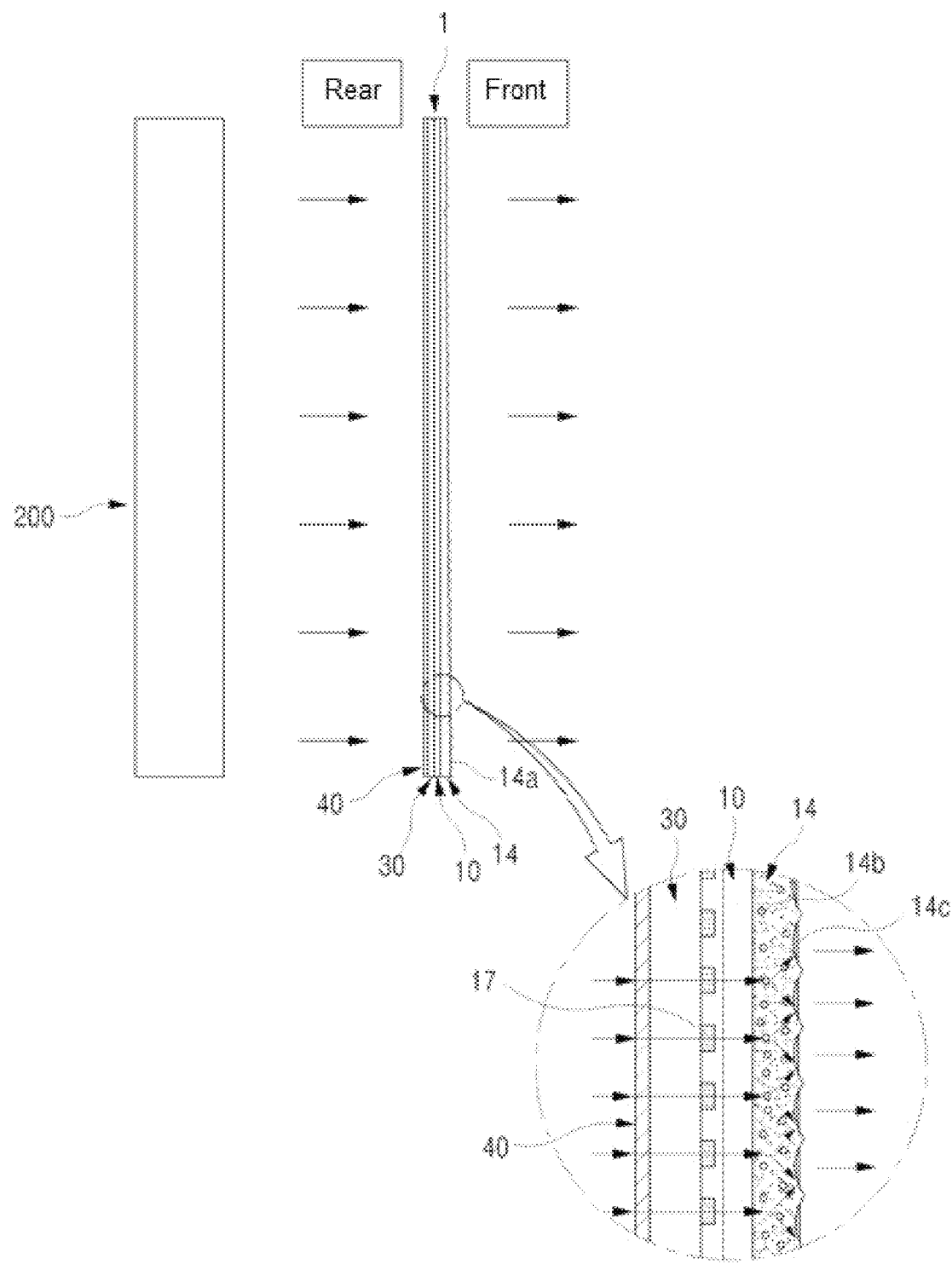
FIG. 4 is a drawing showing the dot film of the present invention.

Referring to FIG. 4, the dot film (10) may comprise a diffusion layer (14) formed on the front surface of the base layer (11), the diffusion layer (14) comprises a light diffusing agent (14b) randomly distributed therein to diffuse light forward and comprises a plurality of round grooves (14a) formed on the front surface, and a light absorption agent (14c) is applied to the round groove (14a) to prevent light saturation by absorbing a part of the light emitted from the image device, and to absorb external illumination light to obtain a clear image, and also light may be diffused forward through a portion to which the light absorption agent (14c) is not applied. As a result, by absorbing and blocking part of the light emitted from the image device, light saturation is prevented, thereby increasing the recognition rate of the electronic pen sensor (P3) and making it possible to judge the exact location information of the dot pattern by the electronic pen and to allow the position to be determined, and the rest of the light is diffused forward, thereby increasing visibility and clarity, without blurring the image on the display screen and significantly reducing the contrast.

Figure 5A:
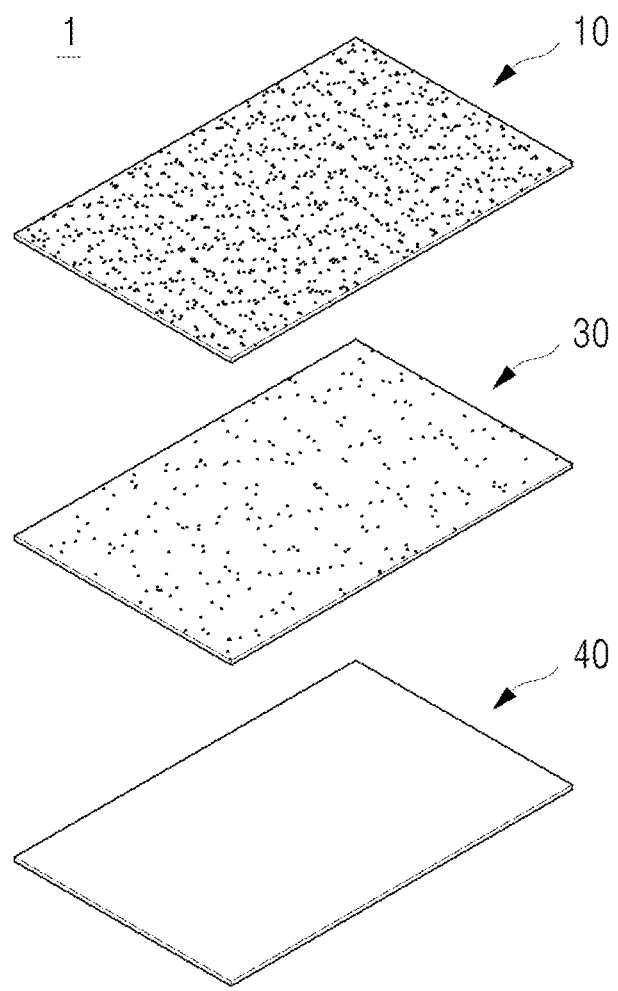
FIG. 5a and FIG. 5b are exploded perspective views of the multi-layers optic sheet of the present invention.
Figure 5B:
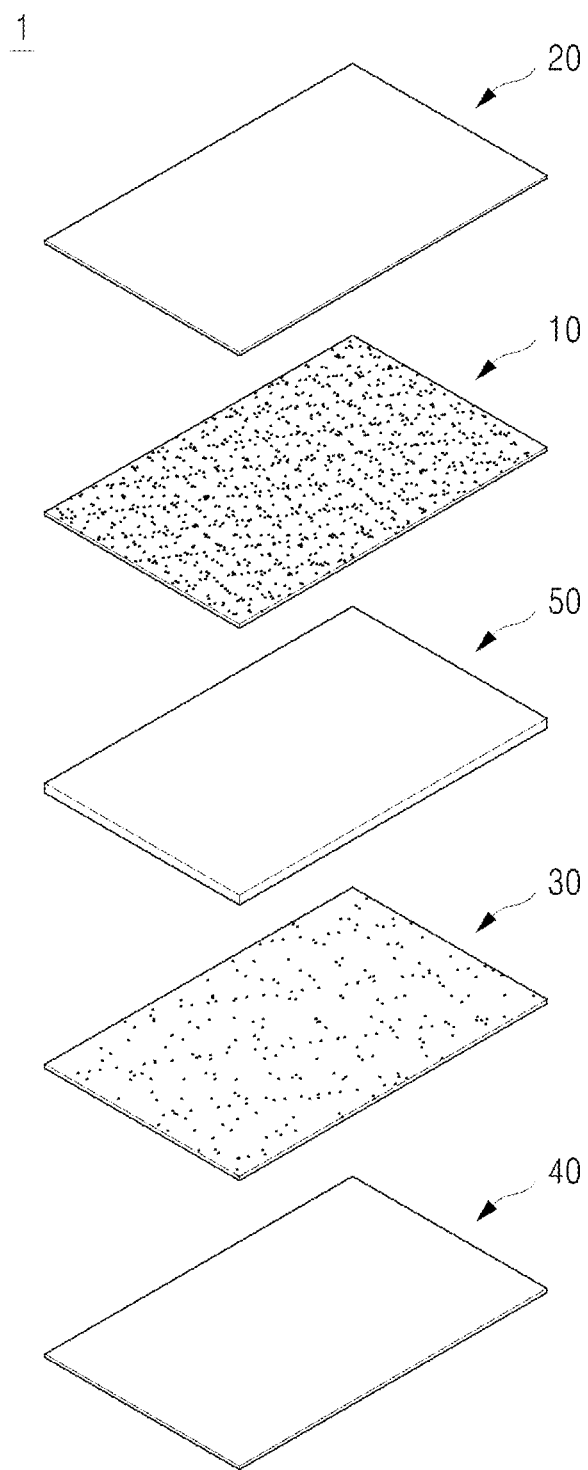

The multi-layers optic sheet (1) of the present invention may be used without attaching the protective film (20), as shown in FIG. 5a, and may be used with attaching a protective film (20) to the front surface of the base layer (11) of the dot film (10), as shown in FIG. 5b. The protective film (20) is made of PET or polycarbonate to protect the dot film (10). If it is made of PET, it can be rolled as a sheet type, so it is easy to store and move. If it is made of a thin plate of polycarbonate, it is not possible to roll it, but it can be flexibly bent and has increased strength and hardness, and thus it does not require frequent replacement due to damage to the protective film by writing, and does not require a flood light plate (50), which will be described later. The protective film (20) is formed by coating a coating layer on the outer surface with a thickness of 0.1 to 0.5 mm to provide an anti-glare function and a UV blocking function, and the protective film (20) transmits light well so that the screen of the image device can be seen more clearly, the electronic pen does not slide well when writing, and accurate writing is possible. The protective film (20) may be detachably attached to the dot film (10) so as to be replaced.

The coating layer may include 30 to 50 parts by weight of acrylate monomer, 1 to 5 parts by weight of 4,4'-diaminobenzophenone, 15 to 20 parts by weight of tris[(3-mercaptopropionyloxy)-ethyl]-isocyanurate (TEMPIC), 1 to 5 parts by weight of menthyl anthranilate, 1 to 5 parts by weight of 3-glycidoxypropylmethyldiethoxysilane, 1 to 5 parts by weight of a polyether siloxane copolymer, 0.1 to 0.5 parts by weight of a dispersing agent, 0.1 to 0.5 parts by weight of an antifoaming agent, and 0.1 to 0.5 parts by weight of a thickener, based on 100 parts by weight of polyurethane acrylate oligomer.

The polyurethane acrylate oligomer preferably has a number average molecular weight of 10,000 to 11,000 g/mol. The polyurethane acrylate oligomer is prepared by performing a step of mixing and reacting polyol and acrylate monomer in a reactor to activate polyol, and then performing a step of mixing and reacting diisocyanate in the reactor to synthesize an urethane prepolymer and performing a step of introducing the urethane prepolymer synthesized to induce reaction with radicals, which are generated from photoinitiators decomposed by ultraviolet rays, and acrylate monomer into the reactor to synthesize a linear polyurethane acrylate oligomer with a double bond introduced at the terminal. The polyol has the greatest effect on optical properties such as the physical properties and refractive index of the polyurethane acrylate oligomer, and since it is most preferable when the structure of the synthesized polyurethane acrylate oligomer is linear, the polyol is preferably in the form of a diol, and for example, ethylene glycol or propylene glycol is preferably used as monomolecular diols. Here, in the step of synthesizing the polyurethane acrylate oligomer, it is preferable to add 1 to 2 moles of acrylate monomer relative to 1 mole of urethane prepolymer. The acrylate monomer may be included in an amount of 30 to 50 parts by weight. In this case, diethylaminoethylacrylate and dimethylaminoethylacrylate, etc., are used as monofunctional monomers, and trimethylolpropane triacrylate, ethylene glycol diacrylate, etc., are used as polyfunctional monomers. 4,4'-Diaminobenzophenone functions as a photoinitiator and may be included in an amount of 1 to 5 parts by weight. If 4,4'-diaminobenzophenone exceeds 5 parts by weight, the unreacted initiator remains as an impurity, the crosslinking density is lowered, and thus the physical properties of the film may be deteriorated, and the reflectance may be increased. tris[(3-mercaptopropionyloxy)-ethyl]-isocyanurate (TEMPIC) may be included in an amount of 15 to 20 parts by weight, which is added to increase the reliability of the coating layer by increasing the adhesive force and maintaining the adhesive force and stability even in a high temperature or high humidity environment and is a polythiol resin that is liquid and contains two or more thiol groups in its molecule. Menthyl anthranilate may be included in an amount of 1 to 5 parts by weight, which absorbs and blocks ultraviolet rays, lowers reflectance, and increases smoothness. If menthyl anthranilate exceeds 5 parts by weight, the scratch resistance may decrease. 3-Glycidoxypropylmethyldiethoxysilane can be included in an amount of 1 to 5 parts by weight, which has a function of increasing adhesive force and stickiness. If 3-glycidoxypropylmethyldiethoxysilane exceeds 5 parts by weight, the flowability may decrease. The polyether siloxane copolymer can be included in an amount of 1 to 5 parts by weight, which improves dispersibility, scratch resistance, and smoothness. If the polyether siloxane copolymer exceeds 5 parts by weight, the coating property may deteriorate and haze may occur, resulting in a decrease in light transmittance. Other additives may be 0.1 to 0.5 parts by weight of a dispersing agent, 0.1 to 0.5 parts by weight of an antifoaming agent, and 0.1 to 0.5 parts by weight of a thickener.

Figure 6A:
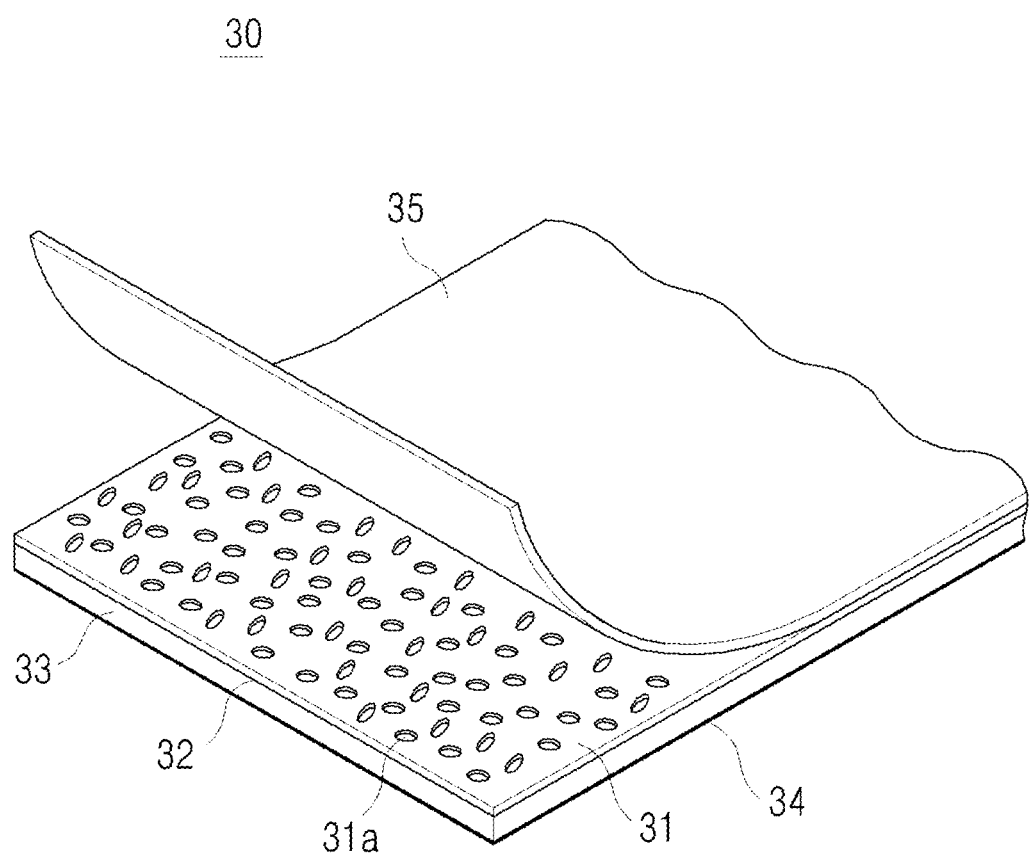
FIG. 6a is a drawing showing the configuration of the block film of the present invention.
Figure 6B:
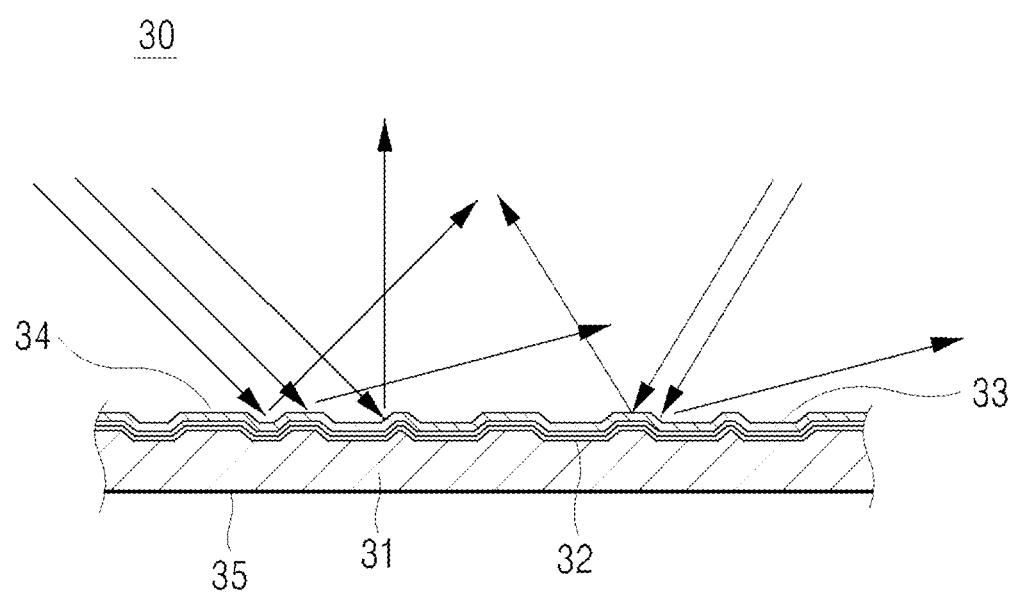
FIG. 6b is a cross-sectional view of the block film of the present invention.

The block film (30) is a kind of reflective film attached to the rear surface of the dot film (10), which is similar to a film that protects privacy. The block film (30) reflects a part of light emitted from the image device and blocks it from being transmitted forward. It is preferable that the light transmittance of the block film (30) is 65 to 90%. If the light transmittance is less than 65%, the visibility and brightness of the display screen decrease, making the writing difficult to see. If the light transmittance exceeds 90%, the recognition rate of the sensor decreases due to light saturation and the image of the dot pattern is distorted, making it difficult to accurately read the location information. In this way, since a block film (30) is provided immediately in front of the image device to increase the reflectance of the light incident from the image device and thus 65 to 90% of the light emitted from the image device is transmitted forward, the display screen can be seen sufficiently from the front, and light saturation is prevented, the recognition rate of the electronic pen is also increased, making it possible to judge the exact location information of the dot pattern by the electronic pen and to allow the position to be determined. For these purposes, referring to FIG. 6a and FIG. 6b, the block film (30) is provided with a base layer (31). The base layer (31) has a plurality of irregularities 31a formed irregularly on one surface to evenly distribute the reflected light and increase reflectance, and has no irregularities on its other surface. On one surface of the base layer (31), an AL deposition layer (32) is deposited and formed to reflect light. A transparent permeation layer (33) such as polypropylene is formed on one surface of the AL deposition layer (32) to transmit light, and a protective layer (34) is formed by coating on one side of permeation layer (33) to prevent damage of the block film (30). On the opposite surface of the base layer (31), an electromagnetic wave blocking layer (35) which is formed by uniformly dispersing one or more fine metal particles selected from copper, silver, nickel, etc. in a transparent synthetic resin may be formed to block electromagnetic waves generated from the image device. At this time, the electromagnetic wave generated from the image device includes infrared rays and ultraviolet rays, wherein by controlling the amount of fine metal particles dispersed in the electromagnetic wave blocking layer (35) of the present invention, infrared rays may be blocked by 75 to 97%, and ultraviolet rays may be blocked by 90% or more. Referring to FIG. 5b, a transparent flood light plate (50) is formed between the patterned film (10) and the block film (30), so that it can be manufactured as a panel-type optic sheet (1), through which the screen of the image device during writing is protected and the strength is enhanced, thereby enabling stable writing with an electronic pen (P). At this time, the flood light plate (50) may be made of any one selected from an acrylic plate, a polycarbonate plate, and a glass plate.

Figure 5C:
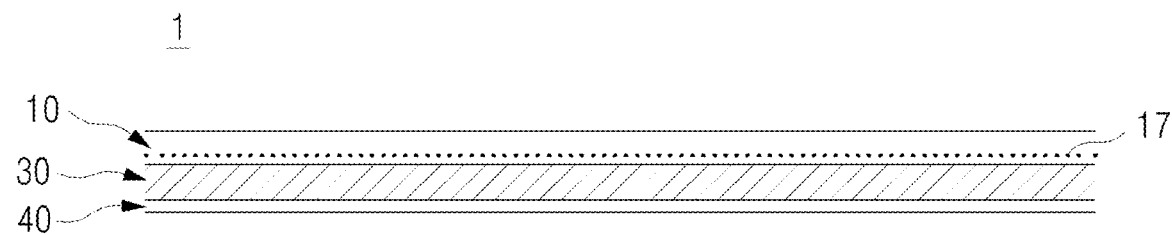

Referring to FIG. 5c, the adhesive layer (40) is formed on the rear of the block film (30) so that it is attached to the front surface of the image device or blackboard. The adhesive layer (40) may be formed by uniformly dispersing fine metal particle fillers made of copper or silver in a binder made of a transparent synthetic resin. The adhesive layer (40) is attached to the screen in contact with the image device, so that the electromagnetic wave blocking effect can be further increased.

Figure 7A:
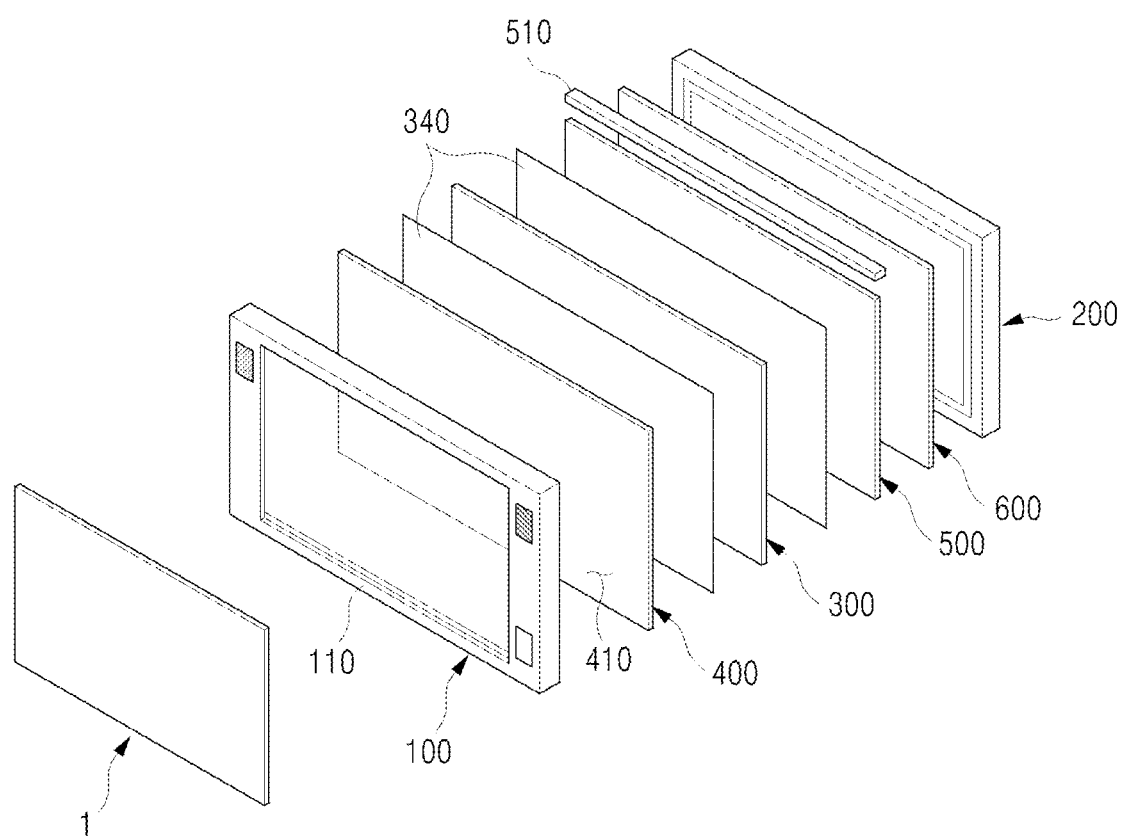
FIG. 7a is an exploded perspective view showing the smart electric board of the present invention.
Figure 7B:
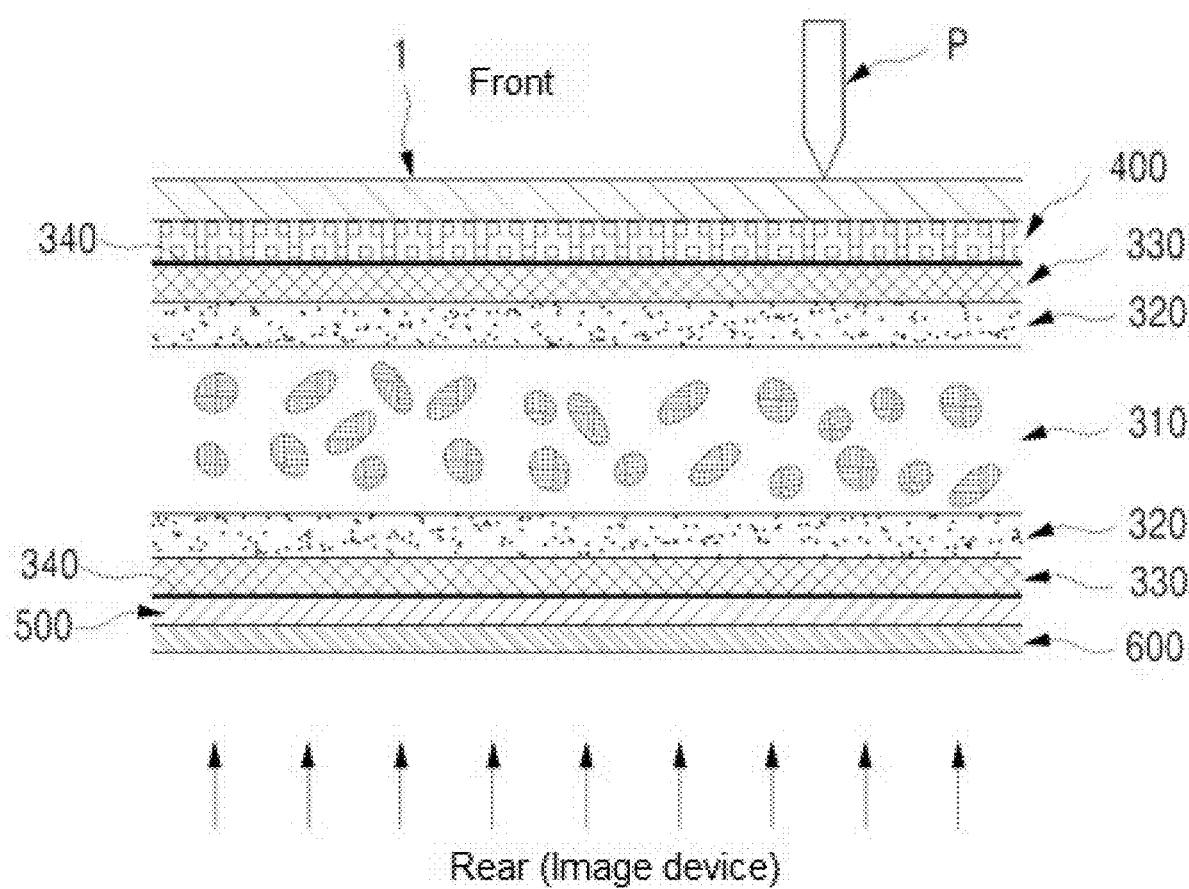
FIG. 7b is a cross-sectional view of the smart electric board of the present invention.

Meanwhile, referring to FIG. 7a and FIG. 7b, the smart electric board (S) according to the first embodiment of the present invention includes a framework (100), an image device (200), a variable panel portion (300), a PMMA sheet (400), a light guide plate (500), a reflective film (600), a control means (900) and an optic sheet (1).

The framework (100) is made in the shape of an approximately square frame by connecting a plurality of unit frames (110).

The image device (200) is installed in the rear of the inside of the framework (100) and its rim portion is directly coupled to the inside of the framework (100) or by a fixing means. For example, the framework (100) may be coupled to surround the rim portion of the image device (200). The image device (200) is a TV combined device equipped with a flat or curved display panel such as OLED, LED, and LCD. In particular, OLED (Organic Light Emitting Diode) is a self-luminous organic material which emits light by itself using an electroluminescent phenomenon that emits light when an electric current flow through a fluorescent organic compound. The OLED is in the form of a thin film having a very thin thickness while providing an image quality higher than LCD quality, is driven by a low voltage, has a wide viewing angle and a fast response speed, and is preferable as the image device of the present invention because the image quality does not change even when viewed from the side and an afterimage does not remain on the screen. The image device (200) may be used not only in a classroom of a school, but also in a lecture room of an academy or an office of a company, to explain the contents of a class or lecture through a computer, or to present a conference or a presentation, by being connected to a computer by wire or wirelessly and displaying an image executed on a computer through a screen of the image device. Speakers (K) electrically connected to the image device (200) may be installed on both sides of the framework (100).

Figure 9B:
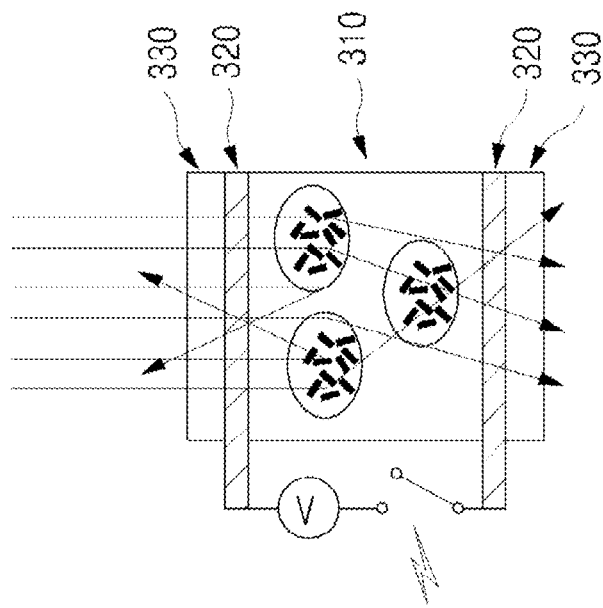
FIG. 9a-b are drawing showing a variable operation in the transparent and opaque condition of the smart electric board of the present invention.
Figure 9A:
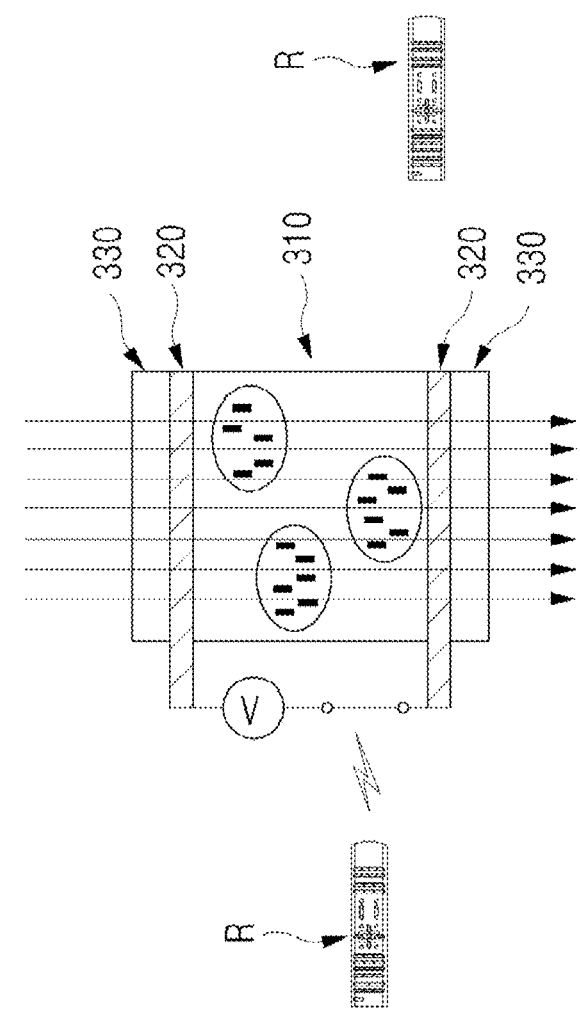

The variable panel portion (300) is coupled to the inside of the framework (100) and disposed to cover the front of the image device (200). When the power supply is turned on through the power supply portion, it becomes a transparent condition and the screen of the image device (200) installed in the rear can be seen. On the contrary, when the power supply of the power supply portion is switched off, it changes to an opaque condition and can be used as a blackboard by general writing with a marker pen. For these purposes, the variable panel portion (300) consists of a polymer dispersed liquid crystal (PDLC) layer (310) which is made of PDLC and transmits or scatters light; a transparent ITO layer (320) which is formed on the front surface and the back surface of the PDLC layer (310), respectively and coated with indium-tin oxide; and a substrate layer (330) formed on the outer surface of each ITO layer (320). Here, the PDLC layer (310) is one of liquid crystal cells used in a liquid crystal display (LCD), and is made of polymer dispersed liquid crystal. In the PDLC layer (310), when the power supply is switched off, the orientation of the molecules of the liquid crystal becomes irregular and causes scattering at an interface having a different refractive index with the medium. When the power supply is turned on, the orientation of the liquid crystal is aligned and the refractive indexes of both are matched, resulting in a transmission condition. The ITO layer (320) is manufactured by coating indium-tin oxide (ITO) on a film such as PET or polyethylene through vapor deposition and is used as a material for a clear electrode of a thin and flat display. The substrate layer (330) may consist of a thin PET (polyethylene terephthalate) or glass substrate, and it protects the inner PDLC layer (310) and the ITO layer (320) and provides strength so that writing can be performed by the electronic pen (P) on the surface. In this way, the PDLC layer (310) is interposed between two substrate layers (330), and at this time, the ITO layers (320), which are transparent electrodes, are formed on the inner side of the two substrate layers (330), and polymer dispersed liquid crystal (PDLC) is filled and sealed between the two facing ITO layers (320) or a film made of polymer dispersed liquid crystal (PDLC) is inserted. In addition, the OCA (optically clear adhesive) film is an optic transparent adhesive film and acts as a double-sided tape. The variable panel portion (300) and the PMMA sheet (400) are attached with an OCA film 340 interposed therebetween, and the variable panel portion (300) and the light guide plate (500) are attached with an OCA film (340) interposed therebetween. At this time, the composition for the OCA film (340) includes 35 to 60% by weight of 2-ethylhexyl acrylate, 25 to 50% by weight of hydroxypropyl acrylate, 1 to 10% by weight of 4,4'-dicyclohexylmethane diisocyanate as a curing agent and 1 to 10% by weight of 2,4,6-trimethylbenzoyl-diphenyl-phosphine oxide as a photo-initiator. The OCA film is prepared by polymerizing the 2-ethylhexyl acrylate and hydroxypropyl acrylate to obtain an acrylate-based polymer, adding the curing agent and the photo-initiator thereto, mixing, coating it, and curing it by heating at 70 to 120° C. In addition, variable conditions of transparent and opaque will be described below. When power is applied to the facing ITO layers (320) from the power supply portion, the polymer dispersed liquid crystals inside the PDLC layer (310) are arranged to have a certain direction by an electric field, thereby resulting in a transparency condition so that light can pass through (transparent mode of FIG. 9(a)). At this time, the viewing angle is 100 to 160 degrees, and the transmittance is 70% or more. On the other hand, under the condition where power is not applied, since the polymer dispersed liquid crystals inside the PDLC layer (310) are randomly and irregularly arranged, incident light is scattered, resulting in an opaque condition (opaque mode of FIG. 9(b)). As a result, by selectively implementing the displays of transparent mode and opaque mode, it is possible to convert the image device into a general blackboard while executing it. such conversion is quick and convenient and enables smooth progression of lectures without turning off pulses in the middle, and electronic writing is possible during video lectures or presentations, and the contents of the lecture can be delivered intensively.

The PMMA sheet (400) is coupled to the substrate layer (330) formed in front of the variable panel portion (300), has a writing surface (410) on which writing is performed, transmits light well without diffused reflection so that the screen of the image device (200) can be seen more clearly, and is attached to the substrate layer (330) by an OCA film (340). PMMA is a polymethyl methacrylate, which is a high molecular substance obtained by polymerizing methyl methacrylates ($CH_2$—$C(CH_3)COOCH_3$) and is usually called acrylic resin, and it is transparent, has high light transmittance, has excellent hardness and gloss, has light resistance, and thus is suitable as a writing surface.

The light guide plate (500) is attached to the back surface of the variable panel portion (300) to protect the image device, which is made of a transparent material and is provided with an LED light source (510) having dimming function. The light guide plate (500) is manufactured by mixing and applying a luminous substance pigment and a hard coating pigment on a PMMA material, and thus radiates and diffuses light from the LED light source (510) to the front when power is applied, and allows the writing function to be increased, increases the visibility and sharpness of the character projected on the writing surface, and makes it possible to deliver the contents of the lecture more intensively. In particular, it is useful when the room is dark. For example, if power is supplied to the LED light source (510) in the condition that the image device (200) is turned off, while conducting a class with the image of the image device (200) in a condition that keeps the interior of the classroom or lecture room dark, written characters can be clearly seen even in a dark room by the divergence and diffusion of light from the light guide plate (500), and it is possible to conduct smooth progression of lectures without turning off pulses in the middle. At this time, since the LED light source (510) has a dimming function, it is possible to adjust the brightness of the light depending on the degree of darkness in the room through the dimming control portion of the control means (900). In addition, the LED light source (510) may be provided in plural so that a lamp group (not shown) having the same illumination color may have different colors. For example, the lamp group may be white, green, or blue. By controlling the power supply portion of the control means (900), one lamp group can be selected and turned on, or multiple lamp groups can be turned on together, thereby providing various lighting colors, so it can be conveniently used according to the content of the class.

Figure 10A:
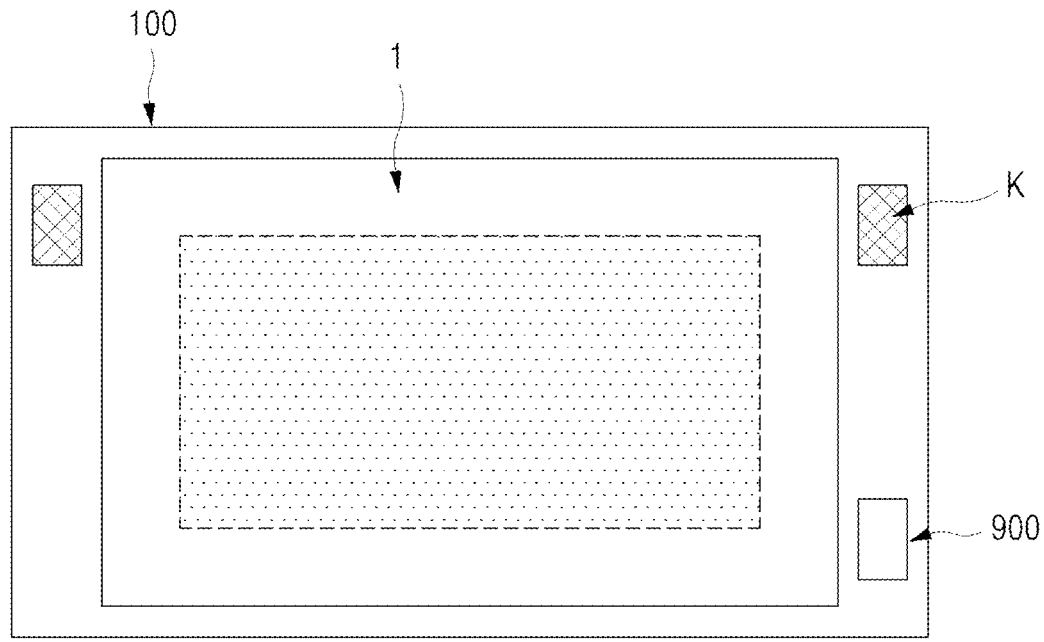
FIG. 10a is a drawing in which the black screen is reflected, when turning off the power supply of the image device in the absence of the reflective film in the present invention.
Figure 10B:
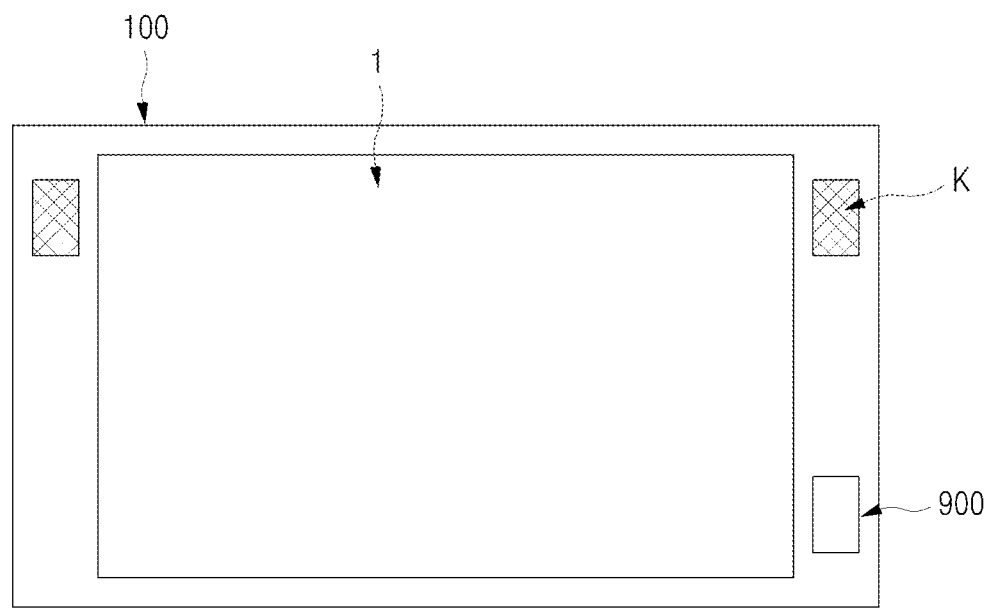
FIG. 10b is a drawing in which the black screen is not reflected when the reflective film is attached.

The reflective film (600) is a kind of reflective film attached to the back surface of the light guide plate (500), which has aluminum deposited on its front surface, thereby reflecting only a part of light. In this way, the reflective film is provided just in front of the image device (200) so that when power is supplied to the image device (200), the screen of the image device (200) is transmitted forward and is viewed, and as shown in FIG. 10a and FIG. 10b, when the power supply of the image device (200) is cut off or the image output is cut off, it is possible to shield the dark black screen from seeing through the writing surface of the PMMA sheet (400), and thus it is possible to prevent the lectures from being disturbed due to the phenomenon that as the black screen is projected and reflected forward, the writing surface does not look neat, or the writing surface becomes dark and thus it becomes difficult to see the written characters. In this way, since about 60 to 85% of visible light is transmitted, the image device with the power supply turned on can be sufficiently viewed, and the black screen of the image device (200) can be sufficiently shielded.

Figure 11A:
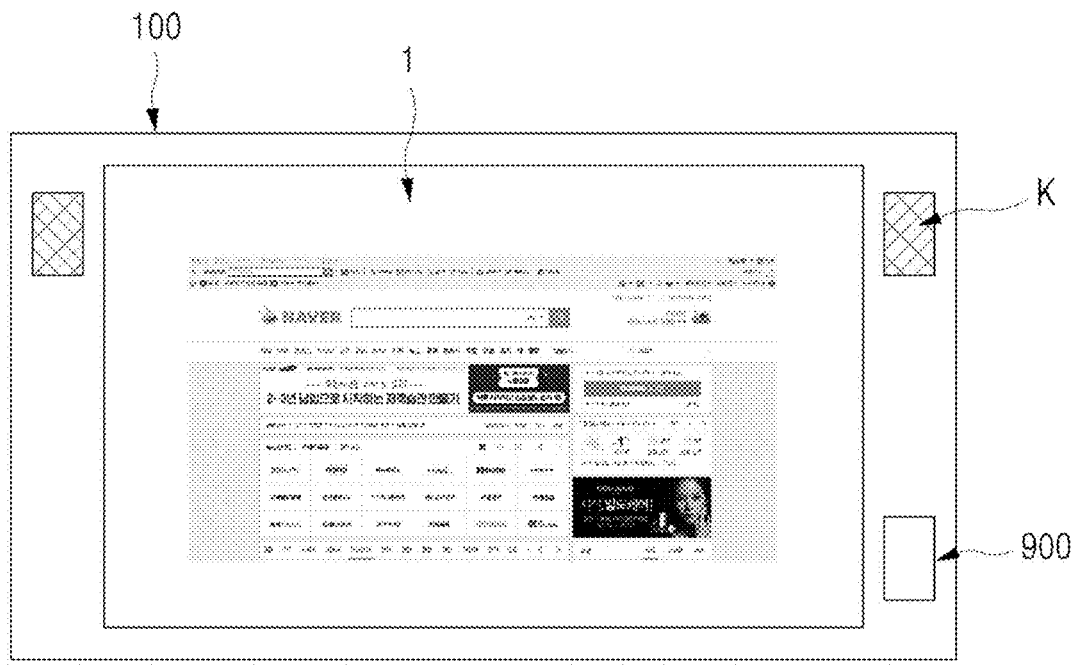
FIG. 11a shows the electronic writing mode of the smart electric board of the present invention.

The control means (900), when used as an electronic writing mode that enables electronic writing while viewing the screen of the image device (200), turns on the power supply of the image device 200, applies a power supply to the variable panel portion (300) and turns off the power supply to the LED light source (510) of the light guide plate (500). In this electronic writing mode, it becomes a transparent condition and thus writing is possible with the screen output of the image device (200), as shown in FIG. 11a.

Figure 11B:
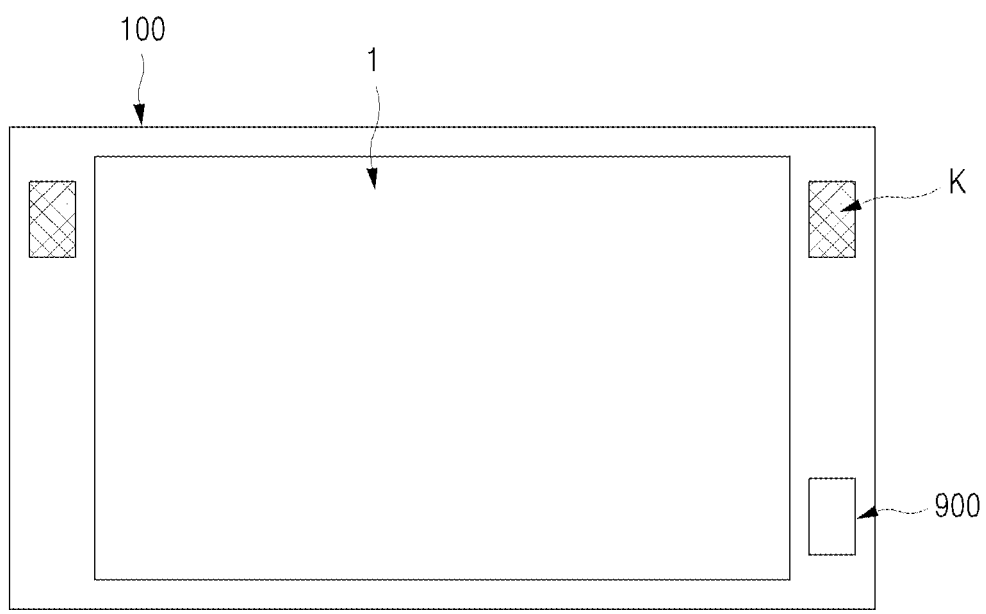
FIG. 11b shows the general writing mode of the smart electric board of the present invention.

In addition, when used as a general writing mode in which writing can be performed by a general writing mean such as a marker pen, the power supply of the image device (200) is turned off, the power supply to the variable panel portion (300) is turned off, and the power supply is turned on to the LED light source (510) of the light guide plate (500). In this general writing mode, since the black screen of the image device (200) is shielded and not reflected and becomes an opaque condition, general writing is possible on the writing surface by a general writing mean such as a marker pen, so it can be used as a board, as shown in FIG. 11b. At this time, by controlling the power supply portion and thus blocking only the image output of the cable connecting the computer and the image device (200) even under the condition that the power supply of the image device (200) is turned on, it is possible to prevent an image from being output to the image device (200). As a result, it is possible to quickly and easily control the image output and change the mode, and the lifetime of the image device can be increased. In addition, when the optic sheet (1) according to the present invention is attached to the front surface of the PMMA sheet (400), it is possible to trace the writing trajectory of the electronic pen (P), so that a function that allows the writing to be recognized and displayed on the screen can be used together.

Figure 8A:
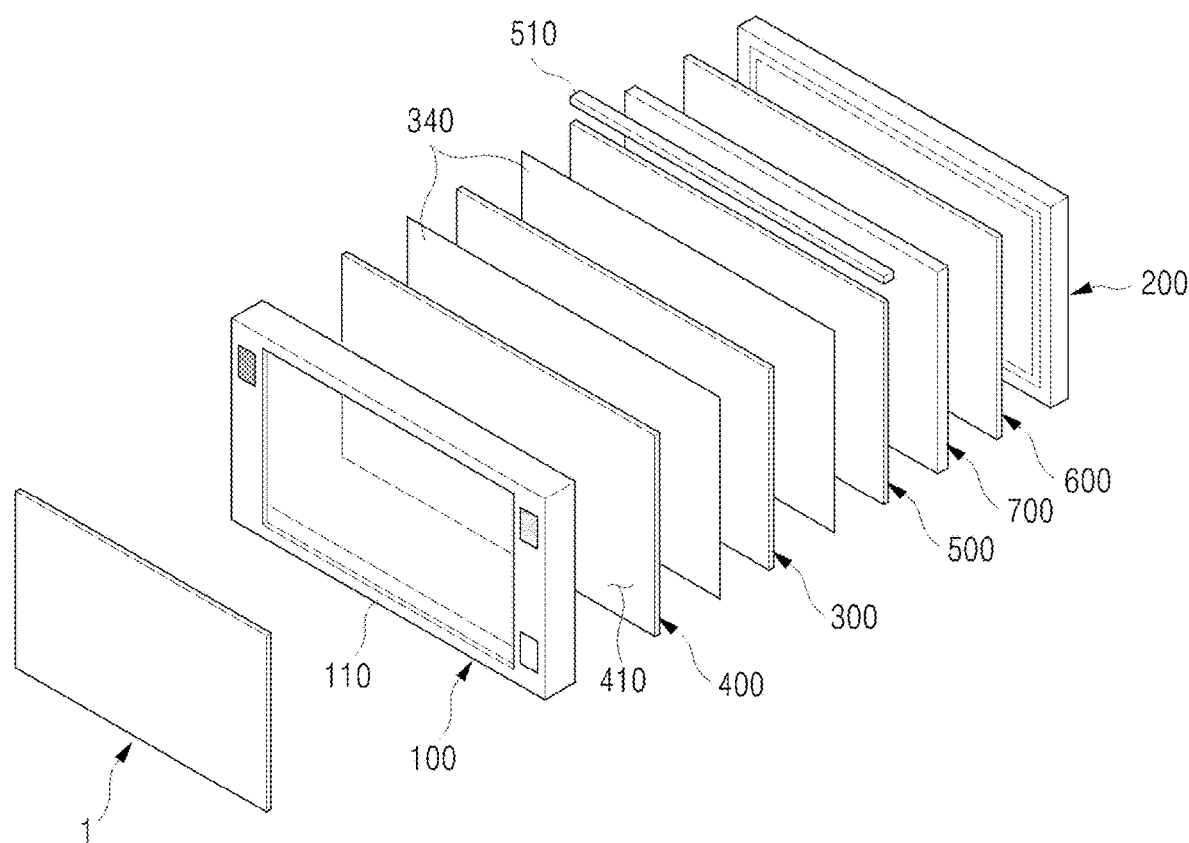
FIG. 8a is an exploded perspective view showing the smart electric board according to another embodiment of the present invention.
Figure 8B:
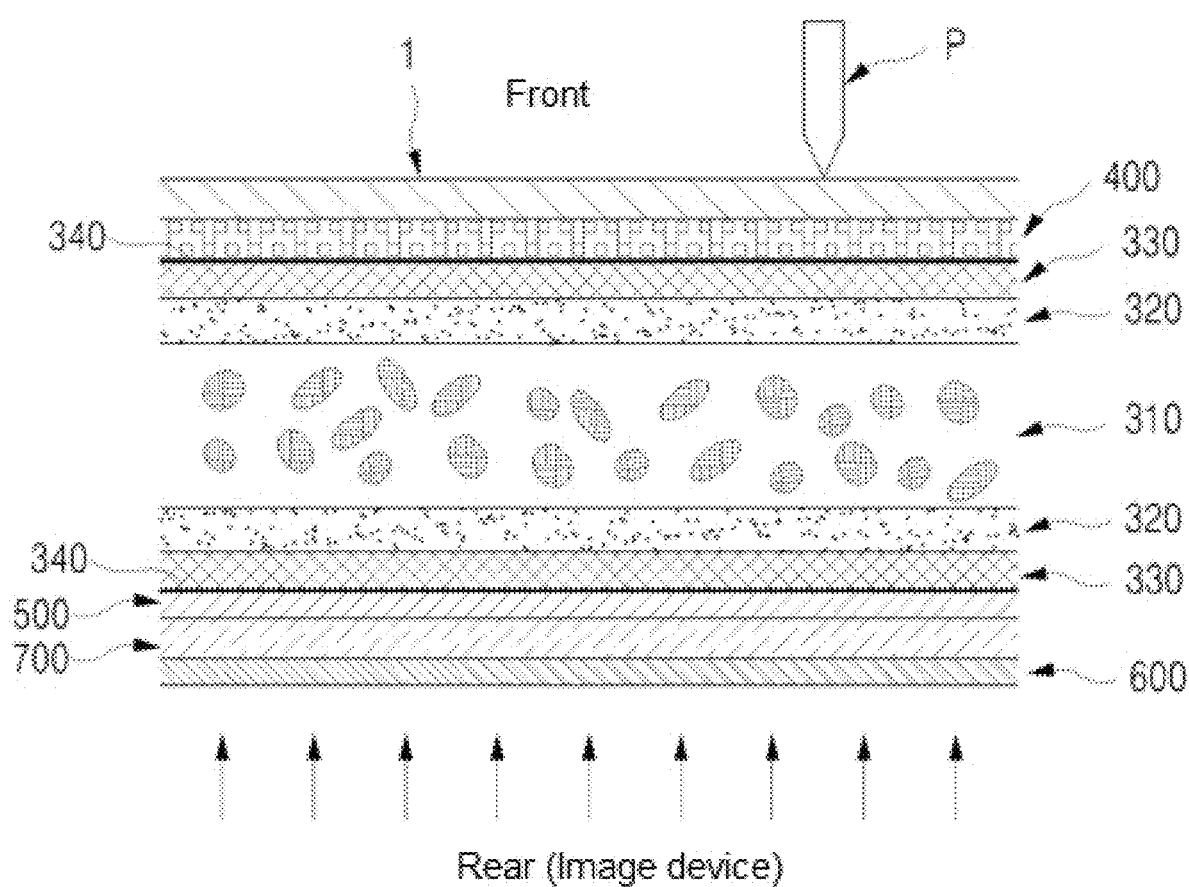
FIG. 8b is a cross-sectional view of the smart electric board according to another embodiment of the present invention.

Referring to FIG. 8a and FIG. 8b, the smart electric board (S) variable in transparent and opaque conditions according to the second embodiment of the present invention comprises a framework (100), an image device (200), a variable panel portion (300), a PMMA sheet (400), a light guide plate (500), a reflective film (600), a tempered glass (700), a control means (900) and an optic sheet (1). The framework (100) is formed in a generally rectangular frame shape by connecting a plurality of unit frames (110). Referring to FIG. 8b, the variable panel portion (300) is coupled to the inside of the framework (100) and disposed to cover the front of the image device (200). The variable panel portion (300) becomes a transparent condition or an opaque condition, respectively, depending on the supply or interruption of a power supply, and comprises a PDLC layer (310) made of polymer dispersed liquid crystal (PDLC) to transmit or scatter light, ITO layers (320) formed on the front and back surfaces, respectively, of the PDLC layer (310) and coated with indium-tin oxide, and substrate layers (330) formed on the front and back surfaces, respectively, of the ITO layer (320).

In addition, the smart electric board (S) according to the second embodiment of the present invention is the same as in the first embodiment in that it comprises a PMMA sheet (400) which is coupled to the substrate layer (330) formed in front of the variable panel portion (300) and has a writing surface on which writing is performed by a writing mean; a light guide plate (500) which is attached to the back surface of the variable panel portion (300), is made of transparent material, is provided with an LED light source (510) having a dimming function, and increases the clarity of the written character by diffusing the light emitted from the LED light source (510) when the power supply is applied; and a control means (900) having a power supply portion that supplies or blocks a power supply. However, in the smart electric board (S) according to the second embodiment of the present invention, a tempered glass (700) is installed between the light guide plate (500) and the image device (200). The tempered glass (700) is installed in front of the image device (200) to protect the image device (200), is transparent, and enhances the strength of the variable panel portion (300) to enable more stable writing. A reflective film (600) is attached to the back surface of the tempered glass (700), and the reflective film (600) has aluminum deposited on its front surface, thereby reflecting only a part of light and thus shielding the black screen of the image device in which the power supply is off or the image output is blocked, so that it is not easily seen.

The control means (900) is equipped with a wireless communication module to receive a control signal wirelessly from a smartphone or a remote control (R) equipped with a dedicated application to control the power supply and perform dimming adjustment, so that the user can quickly and conveniently control and use it. In addition, if the optic sheet 1 according to the present invention is attached to the front surface of the PMMA sheet (400), since it is possible to trace the writing trajectory of the electronic pen (P), so that a function that allows the writing to be recognized and displayed on the screen can be used together.

In addition, if a beam projector is directly projected onto a conventional green blackboard, since the brightness and clarity of the projected image decreases, the diffused reflection of light increases, and thus it is difficult to conduct an image class, whiteboards have been mainly used. However, if the optic sheet (1) of the present invention is attached to the front surface of a green blackboard and used by projecting a beam projector, visibility and clarity are increased, light is not diffused, and thus a neat screen is displayed, so it is possible to perform writing with an electronic pen along with video lessons on the green blackboard.

The dot film, the multi-layers optic sheet and the smart electric board according to the present invention have a thinned thickness, a minimized possibility of an inflow of particles between layers in the production process, and a low reflectance and scattering rate and thus have an excellent reactivity and recognition rate for the electronic pen, and enable not only UV printing but also printer printing such as inkjet and laser, and have an inexpensive production cost, and facilitate penetration and printing of the printing material, and thus are recognized as having industrial applicability.

The invention claimed is:

1. A dot film that enables tracking of a writing trajectory of an electronic pen so that writing is recognized and displayed on a screen or blackboard of an image device, which is formed by applying a resin mixture to a base layer of a synthetic resin, printing a printing material on a rear surface of a resin layer so as to impregnate it thereon and to form fine dots, and then separating and removing the base layer from the resin layer, and then attaching a protective film to a front surface of the separated resin layer, wherein the fine dots are formed on a grid line at intervals from crossing points of virtual grid lines to have a dot value, and have location information encrypted therein so as to determine location information of the electronic pen when writing with the electronic pen, wherein the resin mixture contains 30 to 50% by weight of a polyolefin-based resin, 15 to 25% by weight of a silicone resin, 15 to 25% by weight of an urethane methacrylate oligomer, 5 to 10% by weight of methylene diphenyl diisocyanate, 1 to 5% by weight of tetrahydrofurfuryl methacrylate, 1 to 5% by weight of polyvinylpyrrolidone, 1 to 3% by weight of 2-phenoxyethyl methacrylate, 1 to 3% by weight of polymethacrylate, 0.5 to 2% by weight of 1,4-phenylenebisoxazoline, 0.5 to 1.5% by weight of 1,4-butanediol diacrylate, 0.5 to 1.5% by weight of tetraethylene glycol dimethacrylate, 0.5 to 1.5% by weight of bis(3- ethyl-5-methyl-4-maleimidophenyl)methane, 0.5 to 1.5% by weight of N-[4-(2-benzimidazolyl)phenyl]maleimide, 0.5 to 1.5% by weight of stannous oleate, 0.5 to 1.5% by weight of dibutyltin diacetate, 0.5 to 1.5% by weight of N,N'-bis(2-methyl-1-imidazolyl ethyl) urea, 0.1 to 1.0% by weight of p-toluenesulfonyl hydrazide, 0.1 to 1.0% by weight of epichlorohydrin, and 0.5 to 1.0% by weight of an antistatic agent, wherein the protective film is made of PET or polycarbonate, is detachably attached and thus is provided to be replaced, and has a coating layer applied with a thickness of 0.1 to 0.5 mm on an outer surface thereof to provide an anti-glare function and a UV blocking function, and wherein the coating layer includes 30 to 50 parts by weight of acrylate monomer, 1 to 5 parts by weight of 4,4'-diaminobenzophenone, 15 to 20 parts by weight of tris[(3-mercaptopropionyloxy)-ethyl]-isocyanurate (TEMPIC), 1 to 5 parts by weight of menthyl anthranilate, 1 to 5 parts by weight of 3-glycidoxypropylmethyldiethoxysilane, 1 to 5 parts by weight of a polyether siloxane copolymer, 0.1 to 0.5 parts by weight of a dispersing agent, 0.1 to 0.5 parts by weight of an antifoaming agent, and 0.1 to 0.5 parts by weight of a thickener, based on 100 parts by weight of polyurethane acrylate oligomer.

2. A multi-layer optic sheet for writing by an electronic pen which is composed of multi-layers, is attached to a front surface of an image device or a blackboard of the image device, and is capable of tracing a writing trajectory of the electronic pen so that the writing is recognized and displayed on a screen or the blackboard of the image device, wherein the multi-layers optic sheet comprises:
the dot film according to claim 1;
a block film which is formed in a rear of the dot film, reflects and blocks a part of light emitted from the image device; and
an adhesive layer formed on a rear of the block film and attached to the front surface of or the blackboard of the image device.

3. The multi-layer optic sheet according to claim 2, wherein a transparent flood light plate is formed between the dot film and the block film, and the flood light plate comprises any one selected from an acrylic plate, a polycarbonate plate, and a glass plate.

4. A smart electric board comprising a framework which comprises:
a plurality of unit frames connected with one another;
an image device installed at an inner rear of the framework and equipped with a flat or curved display panel for outputting an image; a variable panel portion which is coupled to an inside of the framework and disposed to cover a front of the image device and becomes a transparent condition or an opaque condition, respectively, depending on a supply or shut-off of a power supply, and which comprises a polymer dispersed liquid crystal (PDLC) layer that is made of PDLC to transmit or scatter light, ITO layers formed on a front surface and a back surface of the PDLC layer and coated with indium-tin oxide, and a substrate layer formed on an outer surface of each ITO layer;
a PMMA sheet coupled to a substrate layer formed in front of the variable panel portion and having a writing surface on which writing is performed;
a light guide plate attached to a back surface of the variable panel portion, which is made of a transparent material, is provided with an LED light source having a dimming function, and diffuses the light emitted from the LED light source to increase a clarity of a written character when the power supply is applied;
a reflective film that is attached to a back surface of the light guide plate and has deposited aluminum to reflect a part of light so that a screen of the image device whose power supply is turned off is not easily seen;
a control means which has a power supply portion supplying power and controls a brightness of the LED light source; and
a multi-layer optic sheet attached to a front surface of the PMMA sheet and including the dot film according to claim 1.

5. A smart electric board comprising a framework which comprises:
a plurality of unit frames connected with one another;
an image device installed at an inner rear of the framework and equipped with a flat or curved display panel for outputting an image;
a variable panel portion which is coupled to an inside of the framework and disposed to cover a front of the image device and becomes a transparent condition or an opaque condition, respectively, depending on a supply or shut-off of a power supply, and which comprises a polymer dispersed liquid crystal (PDLC) layer that is made of PDLC to transmit or scatter light, ITO layers formed on a front surface and a back surface of the PDLC layer and coated with indium-tin oxide, and a substrate layer formed on an outer surface of each ITO layer;
a PMMA sheet coupled to a substrate layer formed in front of the variable panel portion and having a writing surface on which writing is performed;
a light guide plate attached to a back surface of the variable panel portion, which is made of a transparent material, is provided with an LED light source having a dimming function, and diffuses the light emitted from the LED light source to increase a clarity of a written character when the power supply is applied;
a tempered glass installed between the light guide plate and the image device;
a reflective film that is attached to a back surface of the tempered glass and has deposited aluminum to reflect a part of light so that a screen of the image device whose power supply is turned off is not easily seen;
a control means which has a power supply portion supplying power and controls a brightness of the LED light source; and
a multi-layer optic sheet attached to a front surface of the PMMA sheet and including the dot film according to claim 1.

\* \* \* \* \*